Dec. 8, 1942.  J. S. HUBER  2,304,255
OIL PAN BAFFLE
Filed Jan. 27, 1941

INVENTOR.
JOHN S. HUBER
BY Carl J. Barbee
ATTORNEY.

Patented Dec. 8, 1942

2,304,255

UNITED STATES PATENT OFFICE 2,304,255

OIL PAN BAFFLE

John S. Huber, South Milwaukee, Wis., assignor to Nash-Kelvinator Corporation, Kenosha, Wis., a corporation of Maryland Application January 27, 1941, Serial No. 376,113

5 Claims. (Cl. 184—106)

This invention relates to oil pans or reservoirs for pressure lubricated motors and has particular reference to means for returning lubricant from the motor to the main body of lubricant in the oil pan or reservoir of the motor.

It is the general practice to provide internal combustion motors with a pressure lubrication system in which a constantly driven pump supplies oil under pressure to the various bearing surfaces of the motor. The pump generally has a larger capacity than that needed to supply the proper amount of lubricant to the bearings and a by-pass or pressure relief passage is provided for returning the excess lubricant to the oil reservoir usually located in a pan below the motor. When the excess lubricant is permitted to be discharged from the motor into the pan under pump pressure, it tends to cause foaming of the oil in the reservoir and excess splash of lubricant on parts of the motor, which condition it is desirable to avoid.

It is therefore an object of this invention to provide means for conducting excess lubricant from a motor to a reservoir without creating splashing or foaming in the reservoir.

It is another object of this invention to provide a baffle in the oil pan of an internal combustion motor which will be inexpensive to manufacture and install and which will prevent foaming in the oil pan.

It is another object of this invention to provide means for returning excess lubricant from a motor to an oil pan without causing foaming in the oil pan, which means does not need to be connected to the motor.

Other objects and advantages of this invention will be apparent from a consideration of the following description and claims and the attached drawing, of which there is one sheet, and in which—

Figure 1:
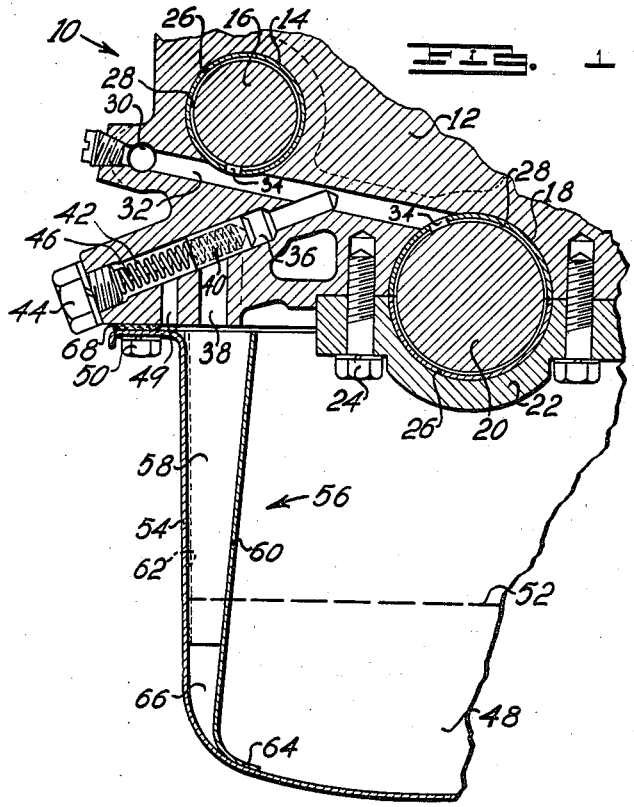
Figure 2:
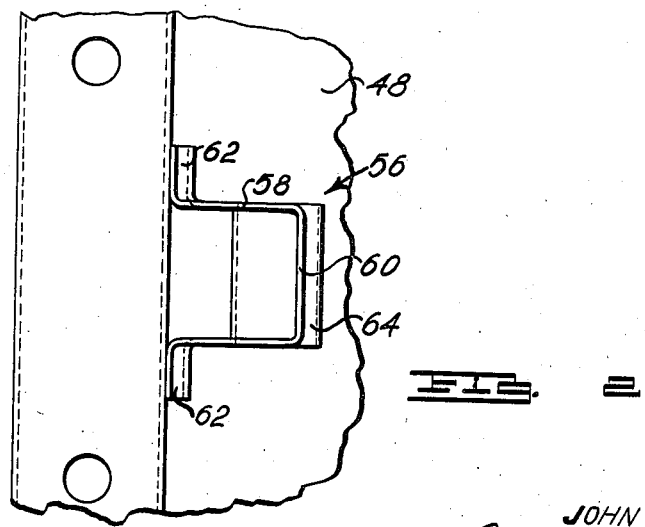

Figure 1 represents a vertical transverse sectional view through the lower portion of an internal combustion motor; and Figure 2 represents a plan view of a portion of the oil pan illustrated in Figure 1.

The drawing illustrates a motor generally indicated at 10 having a transverse wall 12 in which is formed a journal 14 for a cam shaft 16 and the upper portion of a journal 18 for the crank shaft 20. The lower portion of the journal 18 is formed by a bearing cap 22 secured to the wall 12 by means of cap screws 24. Sleeves of bearing material 26 are provided in the journals 14 and 18 and the bearings are provided with internal oil grooves 28.

The side wall of the motor 10 has an oil manifold 30 formed therein from which a gallery 32 extends through the transverse wall 12 intersecting the journals 14 and 18. The bearing sleeves 26 are apertured as at 34 to permit lubricant from the gallery 32 to pass into the oil grooves 28. A pressure relief passage 36 is formed in the lower portion of the motor, which passage communicates with the gallery 32. The relief passage 36 communicates with a discharge passage 38 which opens downwardly from the bottom surface of the motor 10.

A plug 40 is slideably positioned in the relief passage 36 and is arranged to cut off the discharge passage 38 from the relief passage. The plug 40 is urged into position to close the discharge passage 38 by a coil spring 42 which is positioned between the plug 40 and a cap screw 44 threaded into the outer end of the relief passage 36. A centering pin 46 is provided on the inner end of the cap screw 44 to retain the spring 42 in proper alignment.

The usual type of oil pan 48 is secured along the underside of the motor 10 by means of cap screws 50 and is arranged to hold the supply of lubricant which normally stands at a level indicated by the dotted line 52. A vent passage 49 is formed in the motor block 10 and communicates with the space within the oil pan 48 and the relief passage 36 behind the plug 40 so that no pressure will be built up behind the plug.

Oil is delivered under pressure to the manifold 30 by means of a pump (not shown) and when the oil pressure created by the pump is greater than that required to supply sufficient lubricant to the bearings 26, the excess pressure will force the plug 40 outwardly against the compression of the spring 42 and uncover the discharge passage 38 to permit excess lubricant to pass downwardly into the pan 48.

Secured to the side wall 54 of the pan 48 is a baffle generally indicated at 56 which is positioned immediately under the discharge passage 38. The baffle 56 is generally channel shaped in cross section having slightly tapered side walls 58 joined by a center wall 60. The side walls 58 are turned outwardly to form flanges 62 which are welded or otherwise suitably secured to the side wall 54 of the pan 48. It will be noted that the center wall 60 extends downwardly below the bottom of the side walls 58 and is bent over to conform to the contour of the bottom of the pan 48 to which it is welded as at 64. Triangular openings 66 are thus provided on each side of the lower end of the baffle 56. The openings 66 are below the normal level 52 of the lubricant in the oil pan. Since the oil pan 48 is separated from the motor 10 by only a thin gasket 68, the upper end of the baffle 56 will be positioned closely adjacent to the discharge passage 38 and will catch all oil passing therefrom and direct it downwardly through a passage of decreasing cross sectional area to a point below the normal level of the lubricant in the oil pan. I have found that by directing the lubricant discharged from the passage 38 into a relatively small passage from which it is directed to a point underneath the surface of the oil reservoir rather than allowing the discharged lubricant to be released against the surface of the lubricant in the reservoir, I am able to materially decrease the amount of foaming in the reservoir and also prevent lubricant from splashing against the crank shaft 22, which might cause an excess amount of oil to be splashed against the cylinder walls of the motor. The baffle 56 is easily and inexpensively manufactured as a stamping and can be welded to the oil pan without material cost. The underside of the motor 10 is not obstructed by any unnecessary fittings attached to the discharge passage 38. It will be understood that the baffle disclosed is equally effective on any machine having a pressure lubricating system with a relief passage and oil reservoir.

While I have described my invention in some detail, I intend this description to be an example only and not as a limitation of my invention, to which I make the following claims:

1. In combination with an internal combustion motor having an oil discharge passage on the underside thereof, an oil pan secured to the underside of said motor and arranged to catch the oil discharged from said discharge passage, and a baffle secured to said oil pan underneath said discharge passage, said baffle forming a passage of downwardly decreasing cross sectional area opening near the bottom of said oil pan.

2. In combination with an internal combustion motor having a lubricant discharge passage on the underside thereof, an oil pan secured to the underside of said motor and arranged to catch the lubricant discharged from said passage, and a baffle secured to a wall of said oil pan underneath said discharge passage, said baffle and a wall of said oil pan forming a passage of downwardly decreasing cross sectional area opening near the bottom of said oil pan.

3. A baffle secured to the side of an oil pan comprising a stamping having a channel shaped cross section with flanges turned outwardly from the sides thereof, the sides of said baffle tapering toward the bottom of the stamping.

4. A baffle secured to the side wall of an oil pan comprising a stamping having a channel shaped cross section with flanges turned outwardly from the side walls thereof, the center wall of said stamping extending in longitudinally of said oil pan and to below the bottom of said side walls and being secured to said oil pan below said side wall.

5. A baffle secured to the side wall of an oil pan comprising a stamping having a channel shaped cross section with flanges turned outwardly from the side walls thereof, the center wall of said stamping extending below the bottom of said side walls and being secured to said oil pan, said side walls tapering toward the bottom of said oil pan.

JOHN S. HUBER.